(12) United States Patent
Harnik et al.

(10) Patent No.: US 11,057,361 B2
(45) Date of Patent: *Jul. 6, 2021

(54) CLUSTER OF SECURE EXECUTION PLATFORMS

(71) Applicant: International Business Machines Corporation, Armonk, NY (US)

(72) Inventors: Danny Harnik, Tel Mond (IL); Moshik Hershcovitch, Tel Aviv (IL); Paula Ta-Shma, Tel Aviv-Jaffa (IL); Yaron Weinsberg, Jerusalem (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/655,263

(22) Filed: Oct. 17, 2019

(65) Prior Publication Data

US 2020/0053067 A1 Feb. 13, 2020

Related U.S. Application Data

(63) Continuation of application No. 15/652,314, filed on Jul. 18, 2017, now Pat. No. 10,567,359.

(51) Int. Cl.
*H04L 29/06* (2006.01)
*G06F 21/62* (2013.01)
(Continued)

(52) U.S. Cl.
CPC ........ *H04L 63/061* (2013.01); *G06F 21/6209* (2013.01); *H04L 63/0428* (2013.01);
(Continued)

(58) Field of Classification Search
None
See application file for complete search history.

(56) References Cited

U.S. PATENT DOCUMENTS 8,473,754 B2 6/2013 Jones et al.
9,251,378 B2 2/2016 Grocutt
(Continued)

FOREIGN PATENT DOCUMENTS

CN 106465101 2/2017
WO 2010019916 2/2010

OTHER PUBLICATIONS

Chen et al., "A Software-Hardware Architecture for Self-Protecting Data", In Proceedings of the 19th ACM Conference on Computer and Communications Security, Oct. 2012.
(Continued)

*Primary Examiner* — Benjamin E Lanier
(74) *Attorney, Agent, or Firm* — Ziv Glazberg (57) ABSTRACT

A computer program product and a system comprising: a cluster of Secure Execution Platforms (SEPs) having connectivity to a data storage, each SEP of said cluster is configured to maintain, using a key, confidentiality of data while processing thereof; the key is shared among the SEPs of said cluster, the key is automatically generated by the cluster or portion thereof and is unavailable to any non-cluster entity; the data storage retains encrypted data that is encrypted using the key; a first SEP of the cluster is configured to encrypt client data using the key to obtain encrypted client data and store the encrypted client data in the data storage; and a second SEP of the cluster is configured to retrieve encrypted stored data from the data storage, decrypt the encrypted stored data using the key to obtain non-encrypted form of the encrypted stored data.

18 Claims, 4 Drawing Sheets

(51) Int. Cl.
*H04L 29/08* (2006.01)
*G06F 12/14* (2006.01)
(52) U.S. Cl.
CPC ...... *H04L 63/0853* (2013.01); *G06F 12/1408* (2013.01); *G06F 2212/1052* (2013.01); *G06F 2212/154* (2013.01); *G06F 2212/163* (2013.01); *H04L 63/102* (2013.01); *H04L 67/1097* (2013.01)

(56) References Cited

U.S. PATENT DOCUMENTS

| | | | |
|---|---|---|---|
| 10,567,359 B2* | 2/2020 | Harnik | H04L 63/0853 |
| 2005/0086470 A1* | 4/2005 | Strobl | H04L 9/0841 713/163 |
| 2012/0102333 A1 | 4/2012 | Wong | |
| 2014/0161131 A1* | 6/2014 | Yang | H04L 12/4658 370/401 |
| 2014/0281511 A1 | 9/2014 | Kaushik et al. | |
| 2015/0143134 A1* | 5/2015 | Hashimoto | G06F 21/6209 713/193 |
| 2015/0281113 A1* | 10/2015 | Siciliano | H04L 43/0817 709/226 |
| 2015/0309826 A1* | 10/2015 | Kirubanandam | G06F 11/07 718/1 |
| 2016/0350534 A1* | 12/2016 | Poornachandran | H04L 9/3273 |
| 2017/0199752 A1* | 7/2017 | Cao | G06F 9/45558 |
| 2017/0366359 A1* | 12/2017 | Scarlata | H04L 9/3268 |
| 2018/0096137 A1* | 4/2018 | Trostle | G06F 21/33 |

OTHER PUBLICATIONS

Kim et al., "Security Core Technology Implementation for Hardware-based Smart Devices", International Journal of Applied Engineering Research ISSN 0973-4562 vol. 11, No. 8 (2016) pp. 5927-5930.
"Secure Code Execution: Today's Challenge" Can be fount at: https://www.thales-esecurity.com/solutions/by-technology-focus/secure-code-execution Bogetoft et al., "Secure Multiparty Computation Goes Live", FC 2009, LNCS 5628, pp. 325-343, 2009.
Kucuk et al., "Exploring the use of Intel SGX for Secure Many-Party Applications", SysTEX '16, Dec. 12-16 2016, Trento, Italy.
Bahmani et al., "Secure multiparty computation from SGX", Technical Report, IACR Cryptology ePrint Archive, 2016: 1057, 2016.
Brekalo et al., "Mitigating Password Database Breaches with Intel SGX", In Proceedings of the 1st Workshop on System Software for Trusted Execution. ACM, Jan. 2016.
Brenner et al., "SecureKeeper: Confidential ZooKeeper Using Intel SGX", In Proceedings of the 17th International Middleware Conference (Middleware '16). 2016, ACM, New York, NY, USA, Article 14, 13 pages. https://doi.org/10.1145/2988336.2988350.
Chen et al., "PRINCESS: Privacy-protecting Rare disease International Network Collaboration via Encryption through Software guard extensionS", Bioinformatics 33, 6 (2017), 871.
Fisch et al., "Iron: Functional Encryption using Intel SGX", Cryptology ePrint Archive, Report 2016/1071. (2016). http://eprint.iacr.org/2016/1071.
Gupta et al., "Using intel software guard extensions for efficient two-party secure function evaluation", In international Conference on Financial Cryptography and Data Security. Springer, 302-318, 2016.
Vishal Karande et al., "SGX-Log: Securing System Logs With SGX", In Proceedings of the 2017 ACM on Asia Conference on Computer and Communications Security (Asia CCS '17), 2017, ACM, New York, NY, USA, 19-30. https://doi.org/10.1145/3052973.3053034.
Krawiecka et al., "Protecting Password Databases Using Trusted Hardware", In Proceedings of the 1st Workshop on System Software for Trusted Execution (SysTEX '16), 2016, Article 9, 6 pages.
Ohrimenko et al., "Oblivious Multi-Party Machine Learning on Trusted Processors", In 25th USENIX Security Symposium (USENIX Security 16), 2016, Austin, TX, 619-636.
Pass et al., "Formal Abstractions for Attested Execution Secure Processors", In Advances in Cryptology—EUROCRYPT 2017, pp. 260-289.

\* cited by examiner

CLUSTER OF SECURE EXECUTION PLATFORMS

CROSS-REFERENCE TO RELATED APPLICATIONS

This application is a continuation and claims the benefit of U.S. non-provisional application Ser. No. 15/652,314 filed Jul. 18, 2017, which is hereby incorporated by reference in its entirety.

TECHNICAL FIELD

The present disclosure relates to data security in general, and to secure execution platforms, in particular.

BACKGROUND

Today, confidential or private data, generally referred to as sensitive data, is often retained in centralized data storages. The source of such sensitive data may be vary. Whether it is received from a business entity entrusting its trade secrets with the data storage, received from a private citizen required by law to provide biological samples, or from any other source, the confidentiality of the stored data must be maintained.

The data storage may be accessible by a server in response to a client query, and thereby allowing moderate and limited usage of the sensitive data. In some cases, the server ensures that the client has permission to perform such a query, and that its pattern of operation is consistent with the client's role. The server may anonymize the information while processing it, and provide anonymous data in return.

However, the server still processes the sensitive data and has access to the crude data itself. As a result, it may be important to ensure that there is no potential leakage point within the server. In some cases, administrators of such servers are selected with care, and undergo severe scrutiny before given access to the server. The administrators may hold unrestricted access to the data that is retained within the server, and as a result, may have unlimited access to all sensitive data retained in the centralized data storage.

BRIEF SUMMARY

One exemplary embodiment of the disclosed subject matter is a system comprising: a cluster of Secure Execution Platforms (SEPs) having connectivity to a data storage, wherein each SEP of said cluster is configured to maintain, using a key, confidentiality of data while processing thereof; wherein the key is shared among the SEPs of said cluster, wherein the key is automatically generated by said cluster or portion thereof and is unavailable to any non-cluster entity; said data storage retains encrypted data that is encrypted using the key; wherein a first SEP of said cluster is configured to encrypt client data using the key to obtain encrypted client data and store the encrypted client data in said data storage; and wherein a second SEP of said cluster is configured to retrieve encrypted stored data from said data storage, decrypt the encrypted stored data using the key to obtain non-encrypted form of the encrypted stored data.

Another exemplary embodiment of the disclosed subject matter is a computer program product comprising a non-transitory computer readable storage medium retaining instructions to be executed by a Secure Execution Platform (SEP) within a computerized environment, wherein the computerized environment comprising a cluster of SEPs having connectivity to a data storage, wherein the data storage retains encrypted data that is encrypted using a key, wherein the key is shared among the SEPs of the cluster, wherein the key is automatically generated by the cluster or portion thereof and is unavailable to any non-cluster entity, wherein the cluster comprises the SEP, wherein each SEP of said cluster is configured to maintain, using the key, confidentiality of data while processing thereof, wherein the instructions when executed by the SEP, cause the SEP to perform the steps of: in response to receiving first client data over a secure communication channel from a first client device, encrypting the first client data using the key to obtain encrypted client data and storing the encrypted client data in the data storage, whereby the first client data retained in the data storage is not obtainable by any non-computerized entity; in response to receiving an access query from a second client device requiring access to retained data, retrieving an encrypted form of the retained data from the data storage, decrypting the encrypted form using the key to obtain the second client data, and providing a response to the second client device over a secure communication channel, wherein the response is based on the second client data.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

One technical problem dealt with by the disclosed subject matter is to maintain confidentiality of data while processing thereof.

Many applications and programs may involve processing and dealing with sensitive data. The sensitive data should be protected from unauthorized access or modification by rogue software running at higher privilege levels. The confidentiality and integrity of the sensitive data may be required to be preserved without disrupting the ability of legitimate softwares or users to utilize or manage the use of platform resources associated with the sensitive data.

In some exemplary embodiments, the sensitive data may be retained in a way that the legitimate software or users can have access thereto, the ability to add new data without affecting the confidentiality of the existing data, use the existing data in providing different services, or the like. In some exemplary embodiments, it may be desired to prevent untrusted applications and users from accessing to the sensitive data, whether to s read or to update it.

Another technical problem dealt with by the disclosed subject matter is to reduce the risk perceived by vulnerable non-computerized entities, such as human administrators or users.

Many applications and services involved with sensitive data may rely on a centralized trusted party to manage and run them. In some cases, a trusted party, such as an administrator, may abuse or mishandle to sensitive data, leading to a security breach. As an example, the trusted party may be used for handling of a database retaining secure personal healthcare data. As another example, the administrator may manage a secure biometric database. As yet another example, the data storage may store financial data such as in case of a system handling commercial transactions issued by brokerage companies, handling auctions and receiving bids, or the like. The disclosed subject matter may also be used for information escrow, bioinformatics data platforms, healthcare service platforms, or the like.

In some cases, hackers, rouge employees, or the like, may jeopardize the security of the sensitive data, by breaking into privileged accounts, accessing the sensitive data, copying or leaking the sensitive data, or the like, such as for example the Snowden leak.

Yet another technical problem dealt with by the disclosed subject matter is to provide a computerized platform that totally conceals data from human users, and is not subject to any human authority, once being operational.

Keeping data concealed from unprotected computerized entities or users is one of the most difficult problems in practical secure execution. Usually, execution platforms are managed by a human user. Even if execution platforms utilize a cryptographic key to encrypt processed data, such key is known to or is obtainable by a human user, such as in case the server collapses and a new server needs to be executed to replace it, and requires the key in order to decrypt the sensitive data. An attacker who obtains the key can recover original data from the encrypted data, and maliciously use or spread it. The attacker may obtain the key from the human entity who knows the key, such as by stealing it, through payoff, human errors, social engineering, or the like. Additionally or alternatively, the attacker may obtain the key by introducing a malicious software agent to be executed on the execution platform. The malicious software agent may be provided, such as through use of social engineering, with administrator permissions and as a result may be privy to all information accessible to the administrator of the platform.

One technical solution is to automatically generate a key by a cluster of Secure Execution Platforms (SEPs). The key may be utilized to maintain confidentiality of data while processing thereof. The key may be available only to the SEPs of the cluster. Other computerized entities that are not members of the cluster, such as servers, SEPs, computerized apparatuses, or the like, may not have access to the key and may not be able to obtain the key. Furthermore, agents, such as implemented in software, firmware, hardware, combination thereof, being executed by the SEP may be restricted from accessing the key if the agents are not deemed as "authorized". In some cases, the SEP may execute authorized and unauthorized agents at the same time, and permit access to the key only to authorized agents, which follow a protocol in accordance with the disclosed subject matter. In some exemplary embodiments, the authorized agents being executed by the SEP may be the only agents that can obtain the key, decrypt sensitive data using the key, encrypt sensitive data using the key, and process the decrypted data. Additionally or alternatively, the authorized agents may be the only agents that can forward the key to other agents or SEPs.

In some exemplary embodiments, the cluster of SEPs may be connected to a data storage that is configured to retrain the sensitive data. The data storage may retain encrypted form of the data that is encrypted using the key. The data stored in the data storage may be accessed by the authorized agents executed by the SEPs of the cluster, who may be able to decrypt the encryption. The data may be reconstructed using the key and based on the encrypted form thereof.

In some exemplary embodiments, the authorized agents of the SEPs may be configured to decrypt the data using the key and prevent any access to the decrypted data, even when such data is used for computations. The decrypted data may be retained by the SEP in a secure container that is inaccessible to all privileged software being executed by the SEP (e.g., kernel, hypervisor, etc.), except for the authorized agents performing s the processing itself, and as a result, only the authorized agents have access to the sensitive data in its decrypted form.

In some exemplary embodiments, the key may be shared among the SEPs of the cluster. Each SEP of the cluster may be configured to maintain, using the key, confidentiality of data while processing thereof.

In some exemplary embodiments, SEPs of the cluster may be configured to encrypt data using the key to obtain encrypted data. The SEPs of the cluster may then store the encrypted data in the data storage. SEPs of the cluster may be further configured, such as by executing authorized agents, to retrieve encrypted data from the data storage and to decrypt the encrypted stored data using the key to obtain non-encrypted form of the encrypted stored data. In some cases, the SEPs may be configured to serve client queries from client devices, and access the data storage in order to fulfill such queries.

In some exemplary embodiments, the key may be autonomously generated by one of the SEPs, by a combination of several SEPs, or the like. The key may be agreed upon by the cluster using a consensus protocol, such as PAXOS, Chandra-Toueg consensus algorithm, raft, or the like. In some exemplary embodiments, the consensus protocol may be utilized to select a leader who generates the key itself. Additionally or alternatively, several SEPs may be generate random values that are combined to create the key. The key used by the cluster may never be displayed or otherwise outputted to a human user, and may be restricted from being distributed to any other computerized device that is not part of the cluster, or to any unauthorized agent even if such agent is executed by an SEP of the cluster. As such, no human user or other unauthorized entity may be aware of the key and such entity may not, if compromised, compromise the security of the sensitive data.

In some exemplary embodiments, the cluster may be configured to create replicates and add new SEPs to the cluster on the fly. In some cases, if a number of SEPs in the cluster falls below a predetermined threshold, new SEPs are added to the cluster and authorized agents are launched in each new SEP. The new SEPs may receive the key from an SEP already member of the cluster. In some exemplary embodiments, the cluster may keep a minimal size in order to avoid potential loss of the key, and the loss of the sensitive data therewith.

In some exemplary embodiments, the SEPs of the cluster may be provided with different tasks and privileges. In some exemplary embodiments, some SEPs may be able to write data to the data storage, while some SEPs may be able to read data from the data storage. Additionally or alternatively, some SEPs may be able to add new SEPs to the cluster. In some exemplary embodiments, new SEPs that are created may be given specific tasks (e.g., write, read, or the like). The new SEPs may be given a predetermined lifespan, such as one day, one hour, or the like. At the end of the predetermined lifespan, the new SEP may exit the cluster automatically. In some exemplary embodiments, the new SEP may be barred from distributing the key to other devices, including to other SEPs, thereby mitigating potential risk of adding new SEPs to the cluster.

One technical effect of utilizing the disclosed subject matter is to protect against data leakage resulting from insider attacks, rouge employees, hacking of devices of privileged users, social engineering of administrator, or the like.

In some exemplary embodiments, the cluster serves as a sole effective gateway to the sensitive data thereby limiting potential data leakage from the centralized data store.

In some exemplary embodiments, the disclosed subject matter provides for an autonomous computerized entity that is capable of operating without human intervention, and is able to keep a secret key from human controlled systems, including from users having access to the hardware itself, and have root privileges in the operating system being executed thereby.

Another technical effect may be to effectively prevent loss of sensitive data. Using a cluster of SEPs, as opposed to a single SEP, there is a reduced likelihood that all SEPs would become non-operational at the same time, and thus the key, which is only known to them, would be loss. If the key is lost, the encrypted data may become useless.

Yet another technical effect may be to provide for autonomous data management—transferring the responsibility for data from administrators to secure hardware. The autonomous data management cannot be influenced or inspected by any external party. The crucial property of the autonomous data management is that it does only what it was programmed to do.

The disclosed subject matter may provide for one or more technical improvements over any pre-existing technique and any technique that has previously become routine or conventional in the art.

Additional technical problem, solution and effects may be apparent to a person of ordinary skill in the art in view of the present disclosure.

Figure 1:
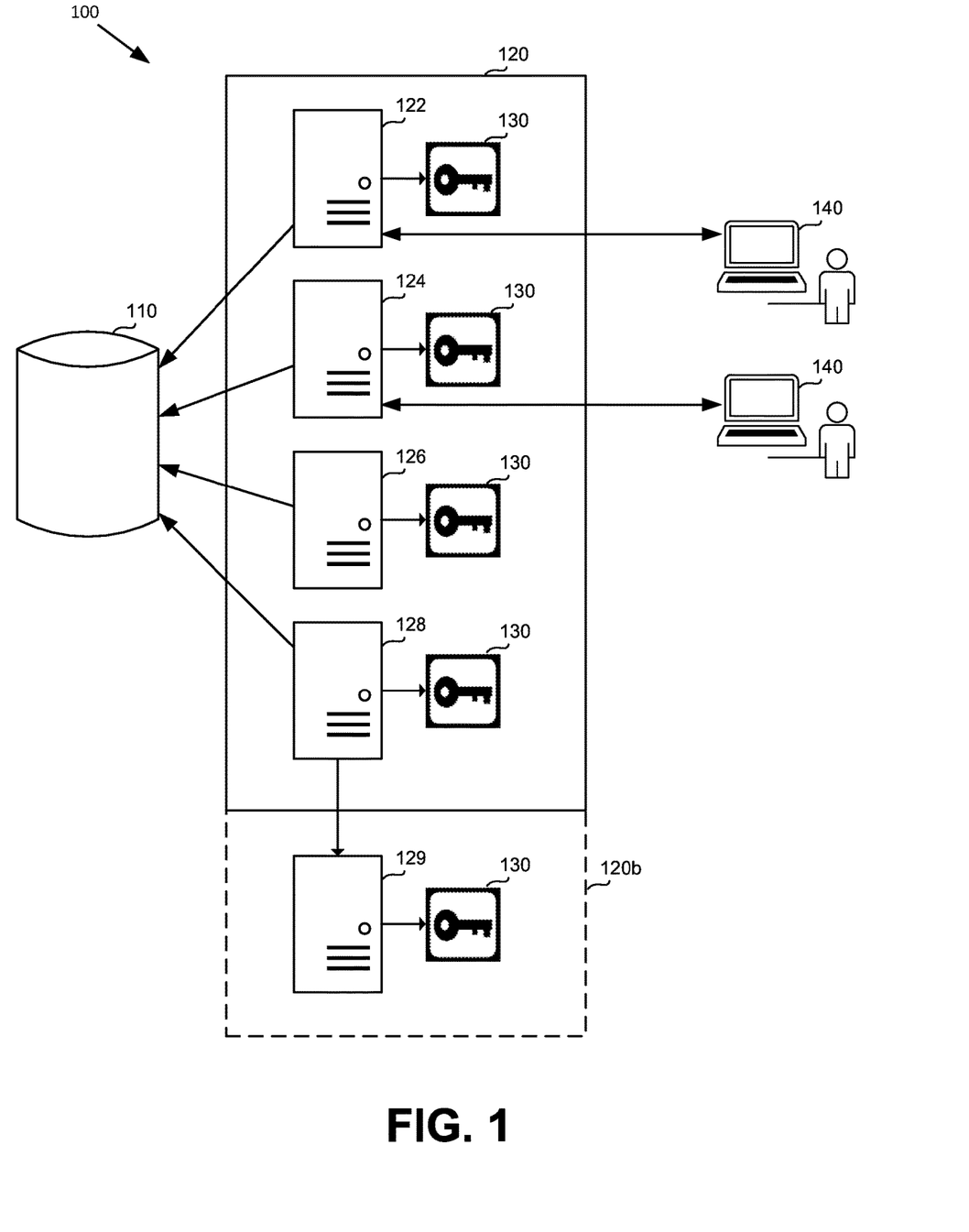
FIG. 1 shows a block diagram of a system, in accordance with some exemplary embodiments of the disclosed subject matter.

Referring now to FIG. 1 showing an illustration of a system, in accordance with some exemplary embodiments of the disclosed subject matter.

In some exemplary embodiments, a System 100 may comprise a Cluster 120 of SEPs 122, 124, 126 and 128. Cluster 120 may comprise any number of SEPs, and FIG. 1 is exemplary only. Each SEP may be based on trusted hardware execution platform, such as Intel™'s Software Guard Extensions™ (SGX™), a server with a Trusted Execution Technology (TXT), a computerized apparatus a Trusted Platform Module (TPM), IBM™'s Secure Blue++ ™, AMD™'s Secure Memory Encryption™ (SME™), or the like.

As an example, SGX™ may be a set of hardware/software extensions to the Intel™ architecture that aims to provide integrity and confidentiality guarantees to security sensitive computation performed on a computer where all the privileged softwares (such as kernel, hypervisor, or the like) are potentially malicious. The trusted hardware may establish a secure container, and a remote computation service user may upload desired computation and data into the secure container. The trusted hardware may protect the data's confidentiality and integrity while the computation is being performed on it. Attestation proofs to users that are communicating with a specific piece of software running in a secure container hosted by the trusted hardware are also provided by the SGX™ product.

In some exemplary embodiments, the SEPs may be built-in secure execution platforms that are configured to provide for a secure and safe computation and execution of software and to defend against software-based attacks aimed at accessing sensitive data by corrupting system, Basic Input/Output System (BIOS) code, modifying platform's configuration, or the like.

Each SEP of Cluster 120 may retain a Key 130. Key 130 may be shared among the SEPs of Cluster 120. Key 130 may be unavailable to any non-cluster entity. It will be noted that an SEP of Cluster 120 may execute authorized and unauthorized agents. Only authorized agents executed by the SEP of Cluster 120 may be considered as cluster entities.

In some exemplary embodiments, Key 130 may be automatically generated by Cluster 120 or portion thereof. Key 130 may be forwarded to all SEPs of Cluster 120. Each SEP of Cluster 120 may be configured, using Key 130, to maintain confidentiality of data while processing thereof. Key 130 may be utilized by the SEPs to determine a functional output of a cryptographic algorithm encrypting the data or representation thereof. As an example, Key 130 may specify a transformation of plaintext representation of the data into ciphertext representation thereof, and vice versa, for decryption algorithms Key 130 may specify transformations in other cryptographic algorithms, such as digital signature schemes, message authentication codes, or the like.

In some exemplary embodiments, Key 130 may be generated to be a symmetric key, to be used both for encryption and decryption of data. Additionally or alternatively, Key 130 may be an asymmetric key comprising a pair of keys, one to be used for encryption, and the other for decryption.

In some exemplary embodiments, Key 130 may be generated by a specific SEP of Cluster 120, such as SEP 126. SEP 126 may be configured to distribute Key 130 to other SEPs 122, 126, and 128. SEP 126 may utilize a cryptosystem to generate Key 130.

In some exemplary embodiments, Cluster 120 may be configured, in response to generating Key 130, to employ a consensus protocol to agree on Key 130. In some exemplary embodiments, SEP 126 may function as a leader of Cluster 120. The leader may be predeterminedly selected, determined based on a predefined order between the SEPs, selected by Cluster 120 dynamically, or the like. The leader may be configured to generate Key 130 and its generated key is used. Additionally or alternatively, there may be a race between different SEPs in which each SEP can generate Key 130. Cluster 120 may then select which of the generated keys would be used as Key 130 of Cluster 120, such as using a consensus protocol. Additionally or alternatively, several SEPs may generate Key 130 together, such as by each determining different portions of Key 130. As an example, each SEP may generate 256 bits, and Key 130 may be composed of four sets of 256 bits.

In some exemplary embodiments, System 100 may comprise a Data Storage 110. Data Storage 110 may comprise a computer readable storage capable of retaining data. In some exemplary embodiments, Data Storage 110 may be a Redundant Array of Independent Disks (RAID), a Network Attached Storage (NAS), Storage Area Network (SAN), a NoSQL or SQL data base, an object store, or the like. Data storage 110 may be configured to retain encrypted data that is encrypted using Key 130. In some exemplary embodiments, the encryption is performed by the SEPs of Cluster 120 and not by Data Storage 110.

As an example, Data Storage 110 may retain a biometric database of digital representation of fingerprints of citizens of a country. The data in Data Storage 110 may be utilized in creating biometrically-verifiable identity cards and passports, in performing governmental research, in identification of individuals and in identifying potential suspects of criminal activity, or the like.

In some exemplary embodiments, an administrator of Data Storage 110 may manage Data Storage 110. The administrator may have unrestricted access to Data Storage 110. Additionally or alternatively, the administrator may create, retrieve and update records in Data Storage 110. However, in the absence of Key 130, administrator may not access the sensitive data in its decrypted form. As an example, the biometric database may be managed by an administrator who is an employee of a national biometric database management authority. The administrator may be able to manage the Biometric Database, update records, create new records, delete records, or the like, without having Key 130. As an example, the administrator may have unrestricted access to a counsel that is used to issue Structured Query Language (SQL) commands to the database. However, as the administrator does not have Key 130 she is unable to decrypt encrypted data retained in Data Storage 110. In some exemplary embodiments, the administrator may be unable to introduce new encrypted data that would be decryptable using Key 130 to Data Storage 110 without having access to Key 130.

Each SEP in Cluster 120 may be connected to Data Storage 110. Some SEPs may be configured to write data to Data Storage 110, read data from Data Storage 110, read and write data from and to Data Storage 110, or the like. In some exemplary embodiments, only SEPs comprised by Cluster 120 may be allowed to read and write from Data Storage 110, and Data Storage 110 may be configured to reject any attempted access that is not performed by members of Cluster 120.

In some exemplary embodiments, an authorized agent executed by SEP 122 may be configured to encrypt client data using Key 130 to obtain encrypted client data. The authorized agent executed by SEP 122 may store the encrypted client data in Data Storage 110. The client data retained in the Data Storage 110 may not obtainable by any non-cluster entity. SEP 122 that has only write access to Data Storage 110, may be referred to as a writer SEP.

In some exemplary embodiments, an authorized agent executed by SEP 122 may be configured to encrypt the client data in response to receiving the client data from a Client Device 140. The encrypted client data may not be directly obtainable by Client Device 140. Additionally or alternatively, Client Device 140 may provide only a portion of the sensitive data retained in Data Storage 110. As a result, potential information leakage from Client Device 140 is a limited risk and does not pose a risk of the entire database being accessed by unauthorized entities.

In some exemplary embodiments, an authorized agent executed by SEP 124 may be configured to retrieve encrypted stored data from Data Storage 110. The authorized agent executed by SEP 124 may be configured to decrypt the encrypted stored data using Key 130 to obtain non-encrypted form of the encrypted stored data. SEP 124 that has only read access to Data Storage 110 may be referred to as a reader SEP.

In some exemplary embodiments, an authorized agent executed by SEP 124 may be configured to retrieve and decrypt the encrypted stored data in response to receiving an access query from a Client Device 140. Client Device 140 may be require access to retained data in Data Storage 110. As Client Device 140 does not have a permission to directly access Data Storage 110, Client Device 140 may require accessing a specified part of the encrypted data stored in Data Storage 110, by transmitting the query to Cluster 120 or directly to an SEP in Cluster 120, such as SEP 124. The authorized agent executed by SEP 124 may retrieve the encrypted form of the relevant retained data from Data Storage 110, decrypt the encrypted form using Key 130, and provide the non-1s encrypted data to Client Device 140 without Client Device 140 having access to Data Storage 110. It may be appreciated that even assuming a client device having an access to Data Storage 110, the client device may not be able to decrypt the stored data, as the client device cannot have Key 130.

In some exemplary embodiments, the same SEP, as an example SEP 122, may be utilized to perform both encryption and decryption of the data. Additionally or alternatively, some SEPs, such as SEP 122 may have write only access permission Data Storage 110, and other, such as SEP 124 may have read only access permission to Data Storage 110.

In some exemplary embodiments, Client Device 140 may be a non-SEP device, such as a personal computer, a laptop, a mobile device, or the like. Client Device 140 may be used by a human user to access Data Storage 110, such as using queries, using a dedicated User Interface, or the like. In some exemplary embodiments, Client Device 140 may be a server that provides web-based user interface for generating queries based on user input, and is configured to issue the queries to Cluster 120.

It may be appreciated that Client Device 140 may or may not be directly connected to SEP 122 or another SEP. In some exemplary embodiments, Client Device 140 may issue a query that is received by a gateway device (not shown) of Cluster 120. The gateway device may, in response, select an SEP of Cluster 120 to handle the query, such as based on load balancing considerations, access permissions of the SEPs, type of query, or the like. In some cases, some SEPs may be a-priori designated to handle specific types of queries, and Cluster 120 may be configured to route the query to an appropriate SEP.

Referring to the biometric database example, employees of the Interior Ministry would be authorized to collect biometric identification data from the citizens, and to transfer the data to a biometric database (e.g., 110). Employees of the Interior Ministry may use devices, such as Client Device 140, to issue update or insert queries that add data to the biometric database. The query may be received by SEP 122, which may encrypt the data using Key 130 and store the encrypted data in the biometric database. Once the data is encrypted, the employees may be unable to extract the data from the biometric database as they are never exposed to Key 130.

On the other hand, data stored in the biometric database may be used to issue resident identification documents, for verification of an individual's identity, or the like. Authorized members, such as police officers, employees of security agencies, or the like, may require to recheck an individual's biometric identification data. In order to do so, they may use Client Device 140, and based on their permissions, they may be able to send an access query to an SEP of Cluster 120, such as 124. The SEP may have Key 130, and accordingly may be able to retrieve the relevant encrypted individual's biometric identification data, decrypt the encrypted individual's biometric identification data, process the biometric identification data and provide a processed result to the authorized member via Client Device 140; without the authorized member knowing Key 130, or having a direct access to the biometric database. In some exemplary embodiments, based on the permissions of the users, they may be restricted to perform specific types of queries, to receive data of different granularity, or the like. As an example, some officers may be able to only insert new data, while others may be authorized to retrieve personalized data regarding specific people. Yet other officers may have access to a verification process which verifies correctness of biometric information without exposing the officer to the biometric information itself, such as by obtaining the biometric reading, transmitting it to SEP, which in turn verifies it against the stored biometric data. Yet other officers may be authorized to issue a limited number of queries.

In some exemplary embodiments, SEPs of Cluster 120 may not be allowed to forward Key 130 to any non-cluster entity, such as other SEPs that are not a part of Cluster 120, to or to any other apparatuses. The SEPs may be programmed not to show Key 130 in their user interface or to otherwise provide human users with Key 130. Users of SEPs of Cluster 120 and other unauthorized agents executed thereby, may not be able to obtain Key 130, despite having access to the SEPs.

In some exemplary embodiments, SEP 128 may be configured to add new SEPs to Cluster 120, such as new SEP 129. An Augmented Cluster 120*b* may be defined. SEP 128 may be configured to forward Key 130 to new SEP 129 over a secure communication channel as part of the process to add new SEP 129 to Cluster 120 when forming Augmented Cluster 120*b*. SEP 128 may be referred to as a grower SEP.

In some exemplary embodiments, any SEP forwarding Key 130 to another entity, such as grower SEP, may verify using attestation that the new SEP is indeed an SEP executing an authorized agent before forwarding the key. The new SEP may verify using attestation that the grower SEP is indeed an SEP executing an authorized agent before accepting the sent key.

In some exemplary embodiments, new SEP 129 may be barred from forwarding Key 130 to any computerized apparatus. In some exemplary embodiments, new SEP 129 may not be grower SEPs by themselves and as a result would not be able to continue increasing the size of Augmented Cluster 120*b*.

In some exemplary embodiments, SEP 128 may be configured to set a predetermined lifespan to new SEP 129, such as few minutes, an hour, a day, or the like. New SEP 129 may be configured to be removed from Cluster 120*b* at the end of the predetermined lifespan. The new SEP may be configured to exit the cluster automatically by itself, to be removed from Augmented Cluster 120*b* by another device, such as SEP 128 or another managing device (not shown) of Cluster 120, or the like. In some exemplary embodiments, New SEP 129 may be configured to delete or purge the copy of Key 130 it retains when exiting Augmented Cluster 120*b*.

In some exemplary embodiments, SEP 128 may be configured to add new SEP 129 to Cluster 120, in response to a number of SEPs in Cluster 120 is below a predefined threshold, such as two, three, ten, or the like. In some exemplary embodiments, a minimal number of SEPs may be desired to be maintained, such as to reduce a likelihood of losing all copies of Key 130. When the number of SEPs reaches a minimal threshold, grower SEPs may be configured to begin spawning new SEPs that are added to Cluster 120 to ensure that sufficient number of copies of Key 130 co-exist.

Additionally or alternatively, SEP 128 may be configured to add new SEP 129 to cluster 120 in response to SEP 122 or SEP 124 becoming non-operational. New SEP 129 may be configured to replace the non-operational SEP. In some exemplary embodiments, New SEP 129's lifespan may be limited to a predetermined lifespan that is estimated to be sufficient until the non-operational SEP becomes operational again.

It may be appreciated that in some cases, other SEPs, such as SEP 122, SEP 124 or SEP 126, may be able to add new SEPs to Cluster 120 or Cluster 120*b*. New SEPs such as new SEP 129, may be, by default, forbidden from adding new SEPs to Augmented Cluster 120*b*. However, in some cases, an administrator of Cluster 120 may give a permission of adding new members to a new SEP 129, such as in case it becomes a part of a backbone of Augmented Cluster 120*b*, in case a grower SEP becomes non-operational, or the like. In some exemplary embodiments, the administrator may have permission to extend a lifespan of an SEP beyond its original predetermined lifespan.

Figure 2A:
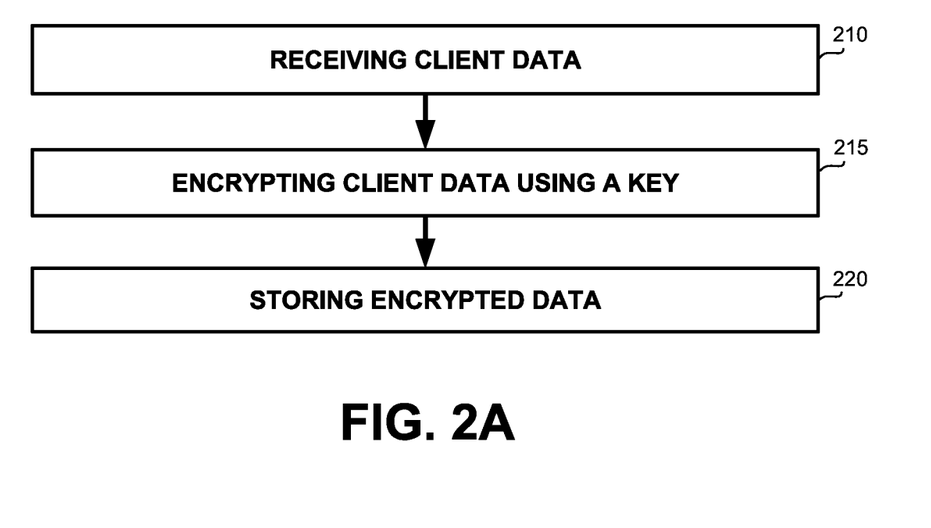
FIGS. 2A-D show flowchart diagrams of methods, in accordance with some exemplary embodiments of the disclosed subject matter.

Referring now to FIG. 2A showing a flowchart diagram of a method, in accordance with some exemplary embodiments of the subject matter.

On Step 210, client data may be received. In some exemplary embodiments, the client data may be received by an SEP, such as 122 of FIG. 1, within a computerized environment. The SEP may be a member of a cluster of SEPs, such as 120 of FIG. 1, having connectivity to a data storage, such as 110 of FIG. 1. The data storage may retains encrypted data that is encrypted using a key. The key may be shared among the SEPs of the cluster. Each SEP of said cluster may be configured to maintain, using the key, confidentiality of data while processing thereof.

In some exemplary embodiments, the client data may comprise sensitive data, such as patient profiles, medical information, national security data, secured payment methods data, financial records, confidential data, or the like. The sensitive data may be desired to be confidentially stored within a secure data storage for future use.

In some exemplary embodiments, the client data may be received from a client device, such as 140 of FIG. 1. The client device may be a non-SEP device, such as a server, a computerized apparatus, or the like. The client device may or may not be operated by a human user. The client device may enable a user to define a query to be issued. The query may be a write query introducing new data or updating existing records in the data storage. The query may be defined using a native program executed by the client device, a program displaying a Graphical User Interface (GUI) when executed by a user device and forwarding the query to the client device, a web-based interface executed by the client device and accessible to the user using a user device, such as a computer executing a web browser, or the like. The client device may not have access to the key nor retain such key. In some exemplary embodiments, the client device may not have a direct access to the data storage.

In some exemplary embodiments, the client device may provide the client data directly to the SEP. Additionally or alternatively, the client device may contact a gateway of the cluster, which may direct the communication from the client device to a target SEP(s) for processing.

On Step 215, the client data may be encrypted using the key to obtain encrypted client data. The client data may be encoded in such a way that only SEPs having the key can decrypt it. In some exemplary embodiments, Step 215 may be performed by an authorized agent that is executed by the SEP.

In some exemplary embodiments, the client data may be encrypted using an encryption algorithm. The key may be a part of the encryption algorithm, a parameter of the encryption algorithm, or the like. An SEP may be able to decrypt the encrypted client data using the key.

On Step 220, the encrypted client data may be stored in the data storage.

Figure 2B:
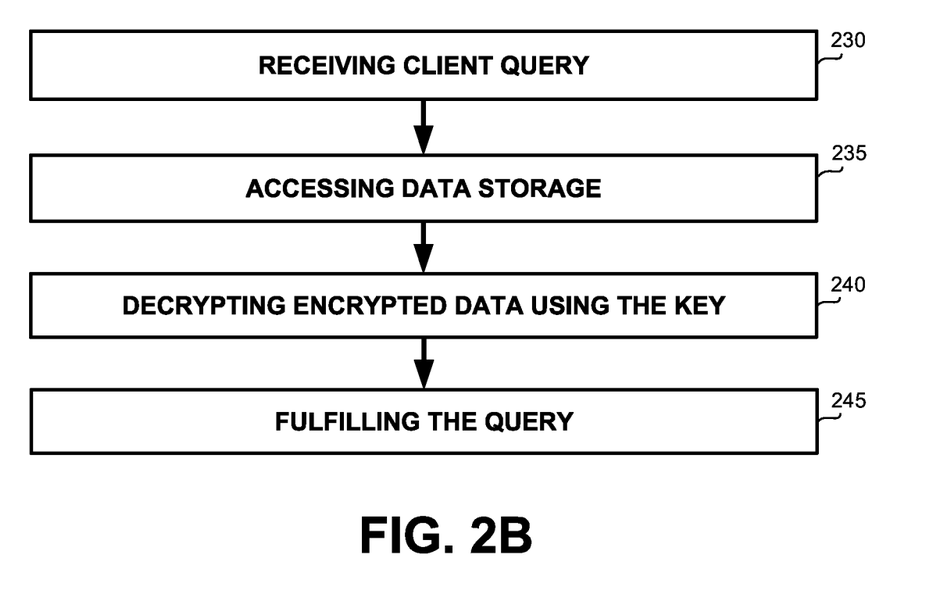

Referring now to FIG. 2B showing a flowchart diagram of a method, in accordance with some exemplary embodiments of the subject matter.

On Step 230, a client query may be received by an SEP, such as 124 of FIG. 1. The SEP may be a member of a cluster, such as 120 of FIG. 1, of SEPs having connectivity to a data storage. The data storage may retain encrypted data that is encrypted using a key, such as encrypted client data stored on Step 220.

In some exemplary embodiments, the query may define portion of the stored data to be obtained by a client device, such as 140 of FIG. 1. Additionally or alternatively, the query may define portion of the stored data to be obtained by the SEP for processing before providing a result based thereon to the client device.

On Step 235, the data storage may be accessed by the SEP. In some exemplary embodiments, the data storage may be accessible only by SEPs of the cluster. The SEP may retrieve encrypted data that is relevant to fulfil the query.

On Step 240, encrypted data retrieved from the data storage may be decrypted by the SEP using the key. The encrypted data may be previously encrypted by the SEP or a different SEP from the cluster, using the key. A non-encrypted form of the encrypted data may be obtained by the decryption. In some exemplary embodiments, Step 240 may be performed by an authorized agent that is executed by the SEP.

On Step 245, the query may be fulfilled. The SEP may utilize the non-encrypted form the encrypted data for fulfilling the query and providing the relevant information to the client device. In some exemplary embodiments, the query may require processing of sensitive data that is performed onboard the SEP, such as by the authorized agent, without exposing the sensitive data itself to the client device. Once processing is completed, the query may be fulfilled by returning a result of the processing (e.g., PASS/FAIL result). Additionally or alternatively, the query may require providing a portion of the sensitive data, such as content of some fields of a record retaining sensitive data. In such a case, the client device may eventually be provided with a portion of the sensitive data retained in the data storage. The query may be fulfilled without the client device having a direct access to the data storage or having an independent manner of decrypting encrypted data retained therein.

Figure 2C:
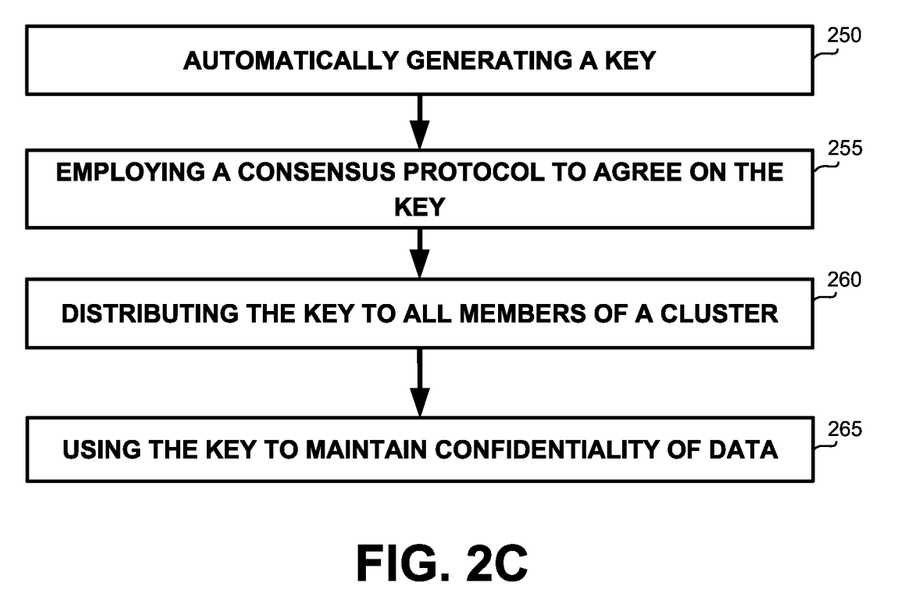

Referring now to FIG. 2C showing a flowchart diagram of a method, in accordance with some exemplary embodiments of the subject matter.

On Step 250, a key may be automatically generated. In some exemplary embodiments, the key may be generated by a cluster of SEPs.

In some exemplary embodiments, the key may be generated by one or more SEPs of the cluster. As an example, a plurality of SEPs may together generate the key, by each generating a different portion thereof, which may be combined together, such as by concatenating the different portions, to create the key. As another example, a single SEP may generate the key.

On Step 255, a consensus protocol may be employed by the cluster to agree on the key. The consensus protocol may enable the various SEPs to agree on a common key. In some exemplary embodiments, the SEPs may each generate a candidate value of the key (e.g., on Step 250), communicate with one another, and agree on a single consensus value for the key. Additionally or alternatively, consensus protocol may be employed on a single candidate key generated on Step 250, and iteratively repeated to generate a new candidate key on every iteration, until a consensus value is reached.

In some exemplary embodiments, the consensus protocol may be applied to agree on a leader SEP that dictates the key for the cluster. Additionally or alternatively, the consensus protocol may be based on a majority or other quorum of the SEPs, agreeing on the key.

In some exemplary embodiments, the consensus protocol may be run by one or more administrators that are not SEPs and provided to the SEPs upon setup.

In some exemplary embodiments, based on a consensus vote, the cluster may agree on a key to be used by the cluster. In some exemplary embodiments, the decision may be irrevocable. Additionally or alternatively, the cluster may periodically decide to change the key by agreeing on a second key. The sensitive data may be decrypted using the key and encrypted before being stored again using the second key.

On Step 260, the key may be distributed to all members of the cluster. In some exemplary embodiments, the key may be distributed to the members by a leader SEP, or as a part of applying the consensus protocol. The leader SEP may be configured to forward the key to each SEP of the cluster that does not already retain the key. In some exemplary embodiments, no distribution is required as during the consensus protocol the SEPs are already informed of the Key.

On Step 265, the key may be used to maintain confidentiality of data. The key may be utilized by the SEPs of the cluster in order to maintain, confidentiality of data while processing thereof. The key may not be available to any non-cluster entity, and the SEPs may be barred from distributing it to any non-SEP device and to SEP devices that are not new members of the cluster.

In some exemplary embodiments, the key may be used to encrypt data before storing in a data storage, and for decryption of the encrypted data before usage thereof.

Figure 2D:
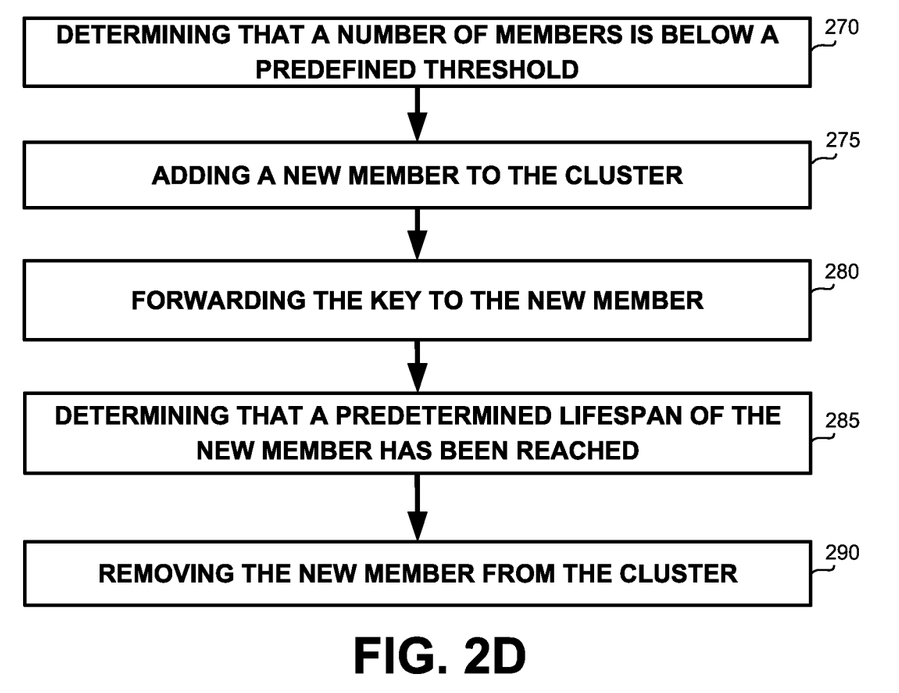
Figure 3:
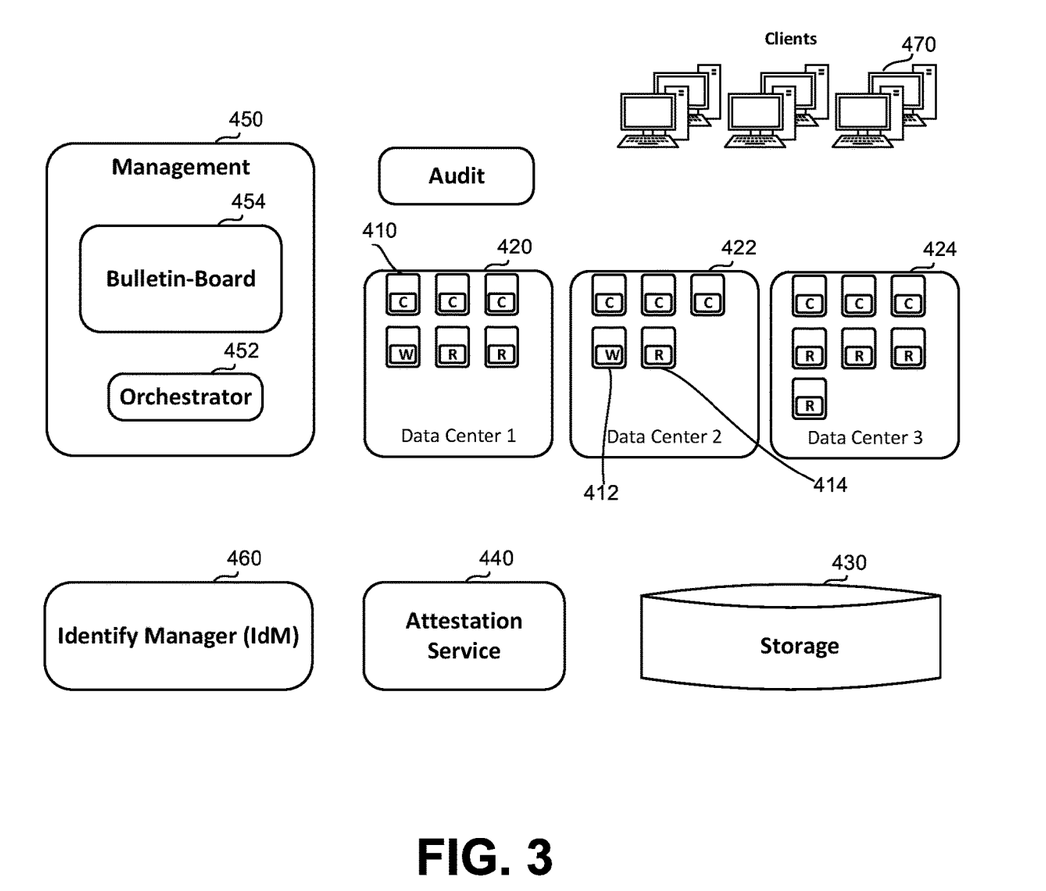
FIG. 3 shows a schematic illustration of a system, in accordance with some exemplary embodiments of the disclosed subject matter.

Referring now to FIG. 2D showing a flowchart diagram of a method, in accordance with some exemplary embodiments of the subject matter.

On Step 270, it may be determined that the number of members of the cluster is below a predetermined threshold. The predetermined threshold may be, for example, about 2, about 3, about 10, or the like. In some exemplary embodiments, the predetermined threshold may be relative to a target size of a cluster, such as about 40% of the desired optimal size. In some exemplary embodiments, the predetermined threshold may be a combination of minimal absolute size and minimal relative size.

In some exemplary embodiments, the threshold may relate to a potential risk of a catastrophe that would cause all SEPs of the cluster to malfunction and potentially lose the key. In some exemplary embodiments, the threshold may provide for a desired redundancy of SEPs. Additionally or alternatively, the threshold may require SEPs to be distributed in different geographical locations, such as at least in three different sites. Additionally or alternatively, the threshold may relate to risk factors that mitigate the risk of all SEPs malfunctioning at the same time.

Additionally or alternatively, the determination may be a determination that an SEP of the cluster has become non-operational. As a result, it may be desired to add a new SEP to take the place of the non-operational SEP in the cluster.

On Step 275, a new member may be added to the cluster. The new member may be an SEP. In some exemplary embodiments, the new SEP may be an SEP of a same type as the SEPs already existing in the cluster.

In some exemplary embodiments, the new member may be added to the cluster by a grower SEP. The grower SEP may be a member of the cluster that is configured to add new members to the cluster. The grower SEP may be configured to add new members in response to the determination of Step 270. The grower SEP may send a software to be loaded on the new SEP that is to be used by the new SEP when being part of the cluster. It may be appreciated that, in addition to the task of adding new members, the grower SEP may be configured to process data, while performing writing to, reading from, the data storage, or combination thereof.

Additionally or alternatively, the new member may be added by any original member of the cluster. An original member of the cluster may be an SEP that has been added to the cluster when the cluster was initially generated. The original members may have permission to add new members to the cluster, forwarding the key to new SEPs, or the like. Non-original SEPs, such as the new member, may or may not be permitted to add new members.

In some exemplary embodiments, the new member may be a temporary member. The grower SEP may be configured to set a predetermined lifespan to the new member. The new member may be configured to be removed from the cluster at the end of the predetermined lifespan. The predetermined lifespan may be set to be ten minutes, one hour, ten hours, one day, or the like. The predetermined lifespan may be set based on the reason of adding the new member, as an example, in case the new member has been added to perform a specific task, such as adding new data during workload surge, the predetermined lifespan may be set to be sufficient for the new SEP to add the new data. As another example, in case the new SEP is added to replace a non-operational SEP, the predetermined lifespan may be based on an expected time of recovery of the non-operational SEP.

On Step 280, the key may be forwarded to the new member. The new member may be configured to maintain, using the key, confidentiality of data while processing thereof. The new member may be barred from outputting the key to any non-cluster entity or from forwarding the key to any device not part of the cluster.

In some exemplary embodiments, the member may be added by an administrator of the cluster. The grower SEP may be configured to provide the key to the new member.

In some exemplary embodiments, the grower SEP may be configured to verify that the new member is an authorized SEP that is allowable to be added to the cluster, before forwarding the key. The grower SEP may check whether the new member is running the authorized agent. Additionally or alternatively, the new member may be configured to verify, such as based on attestation, that the grower SEP is an SEP running the authorized agent before accepting the key.

In some exemplary embodiments, the new member may be configured, based on the permission provided by the grower SEP, the administrator of the cluster, or any other SEP who added the new member, to use the key, such as for writing to or reading from the data storage connected to the cluster. The new member may be configured to encrypt client data using the key to obtain encrypted client data and store the encrypted client data in the data storage. Additionally or alternatively, the new member may be configured to retrieve encrypted stored data from said data storage, decrypt the encrypted stored data using the key to obtain non-encrypted form of the encrypted stored data. It will be noted that the new member may be restricted to perform a specific activity, such as by having a write only or a read only access permission to the data storage, or the like.

On Step 285, it may be determined that the predetermined lifespan of the new member has been reached. In some exemplary embodiments, the determination may be performed by grower SEP. Additionally or alternatively, the determination may be performed by the new member.

On Step 290, the new member may be removed from the cluster. In some exemplary embodiments, in response to the new member determining on Step 285 that the predetermined lifespan has been reached, the new member may purge the key and exit the cluster. In some exemplary embodiments, instead of relying on the new member to purge the key, an alternative key may be determined and used, such as depicted with respect to FIG. 2C.

An Embodiment

An embodiment of the disclosed subject matter was implemented. The embodiment has all sensitive data encrypted with a key that is known only to software running inside Intel™'s SGX™ Enclaves. Enclaves are special computation modes in Intel Skylake™ processors that run all computations on encrypted data. Coupled with a remote attestation capability (a code and platform verification mechanism), the enclaves can serve as the desired robot for executing all data related operations. The embodiment ensures that the key to the encrypted data only resides inside an authorized agent running inside an enclave and therefore the encrypted data can only be useful if accessed via the enclave. In a sense, the embodiment replaces the privileged administrator and software environment by robotic code running in a secure execution environment.

In the embodiment the data becomes useless if the encryption key is lost due to permanent hardware failure. The embodiment runs a cluster of agents sharing the same secret encryption key, rather than a single enclave. This ensures both the durability of the key and is helpful in achieving scalability of the data service.

Referring now to FIG. 4 showing a schematic illustration of the embodiment.

The embodiment comprises a collection of enclave agents sharing a secret key, referred to as "AE-Key". Agents, such as 410, 412, 414 can in general run either on premise or in the cloud. The fact that they run in enclaves ensures their security whether they run in a trusted or untrusted environment. The embodiment categorizes these agents into core agents ("C", such as 410), readers ("R", such as 414) and writers ("W", such as 412). The core agents are responsible for keeping the AE-Key alive and provisioning this key to readers and writers. As such, it is advisable to distribute the cores across a number of physical locations or data centers, typically with a small number of core agents at each location. The readers and writers should be created on demand in order to handle the workload at hand. As such, it is expected that the number of core agents remain steady and well balanced, while the readers and writers fluctuate according to the workload characteristics. FIG. 4 shows an example of a recommended deployment of agents over 3 different physical locations, 420, 422, 424.

The embodiment's design tries to minimize actions performed inside the agent enclaves and relay responsibilities whenever possible to non-secure computation nodes. Storage 430 is a prime example of this, where the agents write the encrypted data to shared storage which provides availability and reliability across the various deployment sites. This can be object storage or a clustered filesystem with built in replication, a NoSQL database, or a standard database with replication.

Attestation Service 440 is an intermediary between the enclave code and the various entities in the system and the Intel™ Attestation Service (IAS™), where the SGX™ hardware verification is actually performed. The embodiment's design requires that once an enclave is created, remote attestation is performed on it generating a publicly verifiable report (including the Enclave Identity, represented by the value of MRENCLAVE) and the specific enclave public keys for authentication and communication. Once this verified report is made public, it serves as a means for various entities to verify the enclave's validity and create new secure communications channels with it.

Management 450 is in charge of orchestration of the entire cluster including the creation (and sunset) of the agent nodes both for the initial inception of the cluster and for scaling the cluster for availability and durability. There are two main subcomponents that make up the Management 450: The Orchestrator 452 subcomponent is in charge of driving the actual operations, including creation of new agents and sunset of redundant or malfunctioning agents. Though these operations can be handled manually, in the embodiment an automated DevOps mechanism is implemented in the agents. Once new agents are created, they do not become fully functional until they approved by more than a single administrator and are registered. Registration is done in the second subcomponent—the Bulletin-Board 454 which is an authenticated registry that serves as the definitive state of the cluster. This agent information in the Bulletin-Board 454 is published for consumption both by public clients and by the actual agent enclaves. The main data in the Bulletin-Board 454 includes the cluster configuration, including a list of the various agents, their roles, public keys and attestation reports.

Client Identity Management (IdM) 460 is an administrative component that deals with how IT organizations define user identities and their privileges. In our system, the IdM 460 is responsible for defining client entities and what permissions or access rights an entity possesses. In the biometric DB use-case clients may be border control personnel or kiosks. In an access control centric use-case like the healthcare services this could be the credentials of healthcare employees along with strict policy as to what information each employee is entitled to retrieve. The role of readers and writers is to enforce the policies stated by the IdM 460. Note that in such a scenario, the IdM 460 becomes a weak link in the chain and can be prone to attacks. The embodiment's design attempts to create a situation where even when an administrator has the tools to access data freely, this data access is not undetected and has at the very least an audit trail.

In the setting one can use additional measures to protect the IdM 460. For example: In cases where the list of clients and properties is not very dynamic, they can be delivered in a secure manner to the agents and audited there before using them. Also, some key credentials may be hardcoded into the agents code to prevent tampering with this information. Finally, some hard rules can be instated and always enforced, for instance, to put a hard limit on the amount of data that a single individual can extract in a single day (and flag suspicious behaviors by otherwise privileged users).

The Clients 470 are the users of the data being managed by the embodiment (e.g. the border control kiosks or the doctors/labs in the healthcare scenario). Clients 470 interact with the readers and writers via secure communication channel (e.g. Secure Sockets Layer (SSL)) based on the agent's public keys. There is no limitation on how they are deployed, on what system and in what language they are implemented.

In a running cluster, Clients 470 are served by reader and writer agents (e.g., 414, 412), a list of which can be accessed via the Bulletin-Board 454. A client that wishes to further verify the identity of the reader/writer (rather than trust the Bulletin-Board 454), may do so by verifying the attestation report of the corresponding enclave which is published on the Bulletin-Board 454. Clients 470 then open an SSL session (or an alternative secure communication channel) with a reader/writer and send their input over it. The agents are made of a secure and insecure part. The insecure part running as a standard process handles all communications with the secure part which runs in an Enclave. On every interaction with a client, the first step is to verify if this client has the sufficient privileges to perform the required task. This verification is based on information from the IdM 460.

Once privileges have been established, the reader or writer can perform their respective tasks and return a response over the secure channel. Note that logic of response can be quite complex and include fine grained access control policies. For example, a reader can respond only X queries (for some parameter X), or only if some data dependent rule is met.

Readers and Writers are generated on demand by the Orchestrator 452. They are attested and inserted into Bulletin-Board 454. Once visible in Bulletin-Board 454, they are initiated, their role is verified according to Bulletin-Board 454, and they receive the secret key, AE-Key, from one of the core agents (e.g., 410). During initialization, they store a time limit which defines their time lease (for this, the sgx_get_trusted_time function provided in the Intel™ SGX™ SDK may be used). Readers and Writers are time limited and after their lease expires they should either self destruct (and erase the AE-Key), or renew their lease. In general, renewing a reader's lease should be driven by an agent's insecure part, since the secure part is passive and cannot drive clock based operations. However, since this code cannot be trusted, the embodiment adds a lease validation step inside a client's request serving code, by which the enclave tests the local clock to see if its lease has expired, and denies further requests if it has. If the insecure part operates correctly, an enclave will not reject queries because of time limitations. There are several options to implement renewing a time lease, the simplest is to check if the reader/writer agent is still valid in the management bulletin-board and if so set up a new lease in the agent's secure part.

The inception of a cluster is one of the most vulnerable phases, susceptible to various attacks such as bad code injection, creation of split clusters or shadow enclaves. Due to this sensitivity, the embodiment takes a cautious approach for cluster inception by which only a fully successful setup is acceptable and any failure results in full abortion of the process and restart from scratch. The cluster will only become operational for writes and reads and populated with data after this process is completed and verified by the lead core agent. Rather than implementing complex leader election code inside the agent enclaves, this process is handled at the management level and made public in the Bulletin- Board 454. The Management 450 agrees on a cluster configuration including a list of the core agents and a designated leader and initiates the setup in the following phases:

(1) agents enclave creation: On each node that hosts an agent, the agent code is uploaded and the enclave is generated. In this phase the agent obtains some important public keys that are critical for its ability to verify the information that it will consume. Specifically, the Intel™ Report Signing Public Key is used to verify all attestation reports, and the Management 450 public key is used to verify information read from the management Bulletin-Board 454.

(2) agents sealing and attestation: Once the enclaves are generated, the first step is to commence a standard sealing and attestation phase. In this phase, a report is created containing a validation of the agent enclave by Intel's attestation service. This phase is managed by Attestation Service 440. The reports generated include the measurement of the agent's code and an entanglement of the enclave with its freshly generated public key. This public key is the means for all external communication with the agent (both for encrypting the communication and for authenticating it). As part of the attestation phase, the agent enclave is required to create a measurement of its own code. This step is also used in order to record the agent measurement (denoted AE-MR), that will be later used to verify the other agents in any future interaction.

(3) Management Bulletin-Board population: Management 450 can now set up its Bulletin-Board 454 and populate it with the list of all agents that form the cluster. Each entry should hold the role of the agent (Core/Reader/Write), its IP address, its public key, and a full attestation report which entangles the agent's code measurement and its public key.

(4) Agent initialization: The various agents can now be initialized with the view of the cluster. This is done by reading the cluster list from Bulletin-Board 454 (and verifying the validity of the list). This is the means for the agents to assume their respective role in the cluster.

(5) Core agents handshake and key creation phase: At this phase the designated lead core agent generates the main key (AE-Key). The rest of the core agents should contact the lead agent and retrieve AK-Key using the core-to-agent key handover protocol discussed below. Due to the sensitivity of the setup phase and as a mean to avoid various attacks of creating split clusters, the lead core agent will approve the success of this step only if it successfully passes AE-Key to all of the other core agents (alternatively, to a predefined threshold of the core agents). In case this does not occur within a given time threshold, the process is aborted and restarted from step 1. A successful process, on the other hand, ends by the lead core agent producing a "read to go" message and posting it on Bulletin-Board 454 (this message can be verified using the lead core's public key). Only after this message is posted does the cluster become active for JO operations. Note that the role of lead core agent is only relevant for the bringing up a new cluster, and therefore failure of the lead core node (either temporary or permanent) is only a concern for a short time cycle. Such a failure will result in aborting the process and starting with a fresh set of agents.

(6) Writer and Reader agents setup: Once the core of the cluster is set, the same handshake and key provisioning can be done between writer and reader agents and core agents. This interaction follows the same protocol as in the core-to-agent key handover protocol.

The embodiment's Core-to-Agent Key Handover Protocol: as mentioned above, a new agent initiates a request for the AE-Key by contacting a core agents from the Bulletin-Board 454. Typically a geographically close can be chosen, this choice and the initiation of the handover is done by the insecure part of the agent. The flow of the handover process involves a mutual attestation test of the two agents involved. Note that key handover is a sensitive operation and cannot rely on the Management 450. Rather, a core agent will only provision the key to an agent that has the exact same code measurement as his code. In this manner, even if the new agent is created maliciously, it is ensured to be running in a true enclave and performing only legal operations no matter who initiated its creation and where. The opposite direction is equally important, ensure that a new enclave does not receive a key from a malicious party (potentially having the entire cluster operate with a compromised key).

Note that the measurement (MRENCLAVE) of a legal agent must be known by the agents themselves for them to be able to verify that they are communicating with a proper agent. However, this measurement cannot be hardcoded into the code since any part of the code is included in the measurement itself (the measurement will change once it is hard coded). One option of solving this is to have the measurement published in the Bulletin-Board 454 and read off it right before attestation commences (it can be added to the user data along side the public key, so it can be verified in the enclave's attestation report). In this method, one can have a list of different measurements, one for the core agent and others for the reader and writer agents. The problem is that this puts a big reliance on Bulletin-Board 454. Instead, the embodiment utilizes a solution by which all agents have the exact same code and will only share the key with an enclave running the exact same code. This practice has limitations during potential software upgrades of the code, but has a strong security advantage in that the key secrecy property relies solely on the correct code implementation (which can be publicly verified) and cannot be affected by compromise of the Management 450.

The Orchestrator 452 drives the cluster inception but is also in charge of the continuous operation of the cluster. It is responsible for adding core agents in case of node failure and for adding (or discontinuing) readers and writers to ensure high availability of the service as the workload grows or shrinks. Every such operation requires two main types of actions: the first is direct operations on the agent, including its creation, launching its attestation and starting its operation, and the second is registering it in the Bulletin-Board 454.

For the operational aspects, the embodiment uses dockerized enclaves and utilizes management tools such as Kubernetes™ or Marathon™. These management operations can be run by a non-trusted entity, since the enclaves will not commence any action without consulting Bulletin-Board 454. Thus, misbehavior of an orchestration action can yield a failure, or denial of service, but will not influence our main security goals. Before being registered, new entries require the approval of a minimum number k of administrators, with k being a configurable parameter depending on the operation itself. For example, adding a reader or writer which are relatively frequent.

The role of Bulletin-Board 454 is to form a central and definitive list of the live agents that are being run. Bulletin-Board 454 is a distributed service managed by a number of administration entities. The service should achieve the following main properties: 1) Consistency—data presented in Bulletin-Board 454 will be the same for any observer. 2) Authentication and liveliness—data read of Bulletin-Board 454 cannot be forged and stale data can be identified (this is to avoid man-in-the-middle attacks).

The embodiment utilizes two alternative implementations for Bulletin-Board 454.

(1) Bulletin-Board Enclave: In this implementation a special enclave is created to manage Bulletin-Board 454. This enclave ingests new entries from administrators, validates their signatures and registers them. It also serves queries from the various components and replies with the current definitive cluster state. It signs the information using a secret key known only to the bulletin-board enclave. Another property is that the bulletin-board enclave can easily generate an audit log consisting of all operations that appeared on it. This ensures that a malicious adversary cannot register an agent and quickly remove it without being noticed.

The consistency property dictates that only a single enclave serves the bulletin-board functionality. This means that in case of a permanent failure to this enclave, its secret key needs to be retrievable by Management 450. Since this information is extremely sensitive, responsibility for it may be relegated to the executive board members (e.g., this may be a relatively large group of administrators and high ranked executives). Upon cluster inception, the bulletin-board enclave is created and executed. Its first step is to generate a public-secret key pair for Bulletin-Board 454. The public key is published and then hardcoded into the agents code. From the secret key, the enclave creates a secret shares for a 1-out-of-n secret sharing scheme (e g Shamir secret sharing) and sends the shares over secure channels to the a list of executive board members (the list is hardcoded into the bulletin board enclave). This information is also sealed by the bulletin-board enclave as a mean to recover from a transient failure. In case of a permanent failure of the machine running the enclave, a new bulletin-board enclave is created, but rather than generating a new key, it regenerates the key from the secret shares sent by the executive board members.

(2) Practical *Byzantine* Fault Tolerant (PBFT): An alternative embodiment of Bulletin-Board 454 is based on running a Practical *Byzantine* Fault Tolerant (PBFT) cluster, which implements a distributed fault tolerant scheme. This service was implemented in the Fabric of Hyperledger project, as part of the open source effort for Blockchain technologies. The need for fault tolerance to *Byzantine* faults as opposed to regular failures stems from the threat model at hand: the possibility that a rogue administrator could influence the bulletin-board by injecting malicious messages. Note that Bulletin-Board 454 does not have to handle a large traffic load and can be based on a small cluster and hence the performance limitations of running a large scale PBFT are immaterial. This embodiment adds some complexity of communications, but has the advantage of high availability in face of failure or an attempt to cause a denial of service.

In both cases, liveliness of data can be tested by querying Bulletin-Board 454 with a nonce and having the enclave or PBFT incorporate the nonce into the signature.

The embodiment's design has the invariant by which the only times AE-Key is ever transferred is to enclaves with the exact same agent code, a fact which is at the base of the embodiment's key secrecy guarantee. This makes code upgrades problematic, and requires special mechanism to handle such scenarios. In such a sensitive case, rather than requiring a validation by a small number of administrators, approval will be necessary from the executive board members (depending on the use case, this can be a board of high ranked individuals). Upgrade public-keys for verifying such a process are hard coded during code creation. Once an upgrade has commenced, the measurement of the new code base will be published in bulletin Board 454, and the old set of core enclaves will pass AE-Key to the new cores while validating the new MRENCLAVE is suitable. At the end of the process the old enclaves will sunset.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system comprising:
    a cluster of Secure Execution Platforms (SEPs) having connectivity to a data storage, wherein each SEP of said cluster is configured to maintain, using a key, confidentiality of data while processing thereof;
    wherein the key is shared among the SEPs of said cluster, wherein the key is automatically generated together by at least two SEPs in said cluster or a portion thereof, wherein the key is unavailable to any non-cluster entity;
    said data storage retains encrypted data that is encrypted using the key;
    wherein a first SEP of said cluster is configured to encrypt client data using the key to obtain encrypted client data and store the encrypted client data in said data storage; and
    wherein a second SEP of said cluster is configured to retrieve encrypted stored data from said data storage, decrypt the encrypted stored data using the key to obtain non-encrypted form of the encrypted stored data.

2. The system of claim 1, wherein said second SEP is configured to retrieve the encrypted stored data in response to a query from a client device, wherein the non-encrypted form of the encrypted stored data is utilized to provide a response to the query, whereby fulfilling the query without the client device accessing said storage data.

3. The system of claim 1, wherein said first SEP and said second SEP are a same SEP.

4. The system of claim 1, wherein said first SEP has write only access permission to said data storage, and wherein said second SEP has read only access permission to said data storage.

5. The system of claim 1, wherein a third SEP of said cluster is configured to add a new SEP to said cluster, wherein said third SEP is configured to forward the key to the new SEP over a secure communication channel.

6. The system of claim 5, wherein the third SEP is configured to verify correctness of a code and a platform of the new SEP using an attestation mechanism before forwarding the key over a secure channel.

7. The system of claim 5, wherein the new SEP is configured to verify correctness of a code and a platform of the third SEP using an attestation mechanism before accepting the key from the third SEP.

8. The system of claim 5, wherein the new SEP is barred from forwarding the key.

9. The system of claim 5, wherein said third SEP is configured to set a predetermined lifespan to the new SEP, wherein the new SEP is configured to be removed from said cluster at the end of the predetermined lifespan.

10. The system of claim 5, wherein said third SEP is configured to add the new SEP to said cluster, in response to a number of SEPs in said cluster is below a predefined threshold.

11. The system of claim 5, wherein said third SEP is configured to add the new SEP to said cluster in response to said first SEP or said second SEP becoming non-operational, whereby the new SEP is configured to replace a non-operational SEP.

12. The system of claim 5, wherein said third SEP is a same SEP as said first SEP or said second SEP.

13. The system of claim 1, wherein the key is generated by a third and a fourth SEPs of said cluster, wherein the third SEP or the fourth SEPs are configured to distribute the key to other SEPs in said cluster.

14. The system of claim 1, wherein said cluster is configured, in response to generating the key, to employ a consensus protocol to agree on the key.

15. The system of claim 1, wherein an administrator of said cluster or said data storage does not have the key.

16. A computer program product comprising a non-transitory computer readable storage medium retaining instructions to be executed by a Secure Execution Platform (SEP) within a computerized environment, wherein the computerized environment comprising a cluster of SEPs having connectivity to a data storage, wherein the data storage retains encrypted data that is encrypted using a key, wherein the key is shared among the SEPs of the cluster, wherein the key is automatically generated together by at least two SEPs in the cluster or a portion thereof, wherein the key is unavailable to any non-cluster entity, wherein the cluster comprises the SEP, wherein each SEP of said cluster is configured to maintain, using the key, confidentiality of data while processing thereof, wherein the instructions when executed by the SEP, cause the SEP to perform the steps of:

in response to receiving first client data over a secure communication channel from a first client device, encrypting the first client data using the key to obtain encrypted client data and storing the encrypted client data in the data storage, whereby the first client data retained in the data storage is not obtainable by any non-computerized entity;

in response to receiving an access query from a second client device requiring access to retained data, retrieving an encrypted form of the retained data from the data storage, decrypting the encrypted form using the key to obtain the second client data, and providing a response to the second client device over a secure communication channel, wherein the response is based on the second client data.

17. The system of claim 1, wherein the key is composed of multiple key-portions, each generated by a different SEP in the cluster or portion.

18. The system of claim 1, wherein the key is generated by a race, wherein each SEP in the cluster or portion generates a suggested key and the cluster or portion selects the key to be used form the suggested keys.

* * * * *